UNITED STATES PATENT OFFICE.

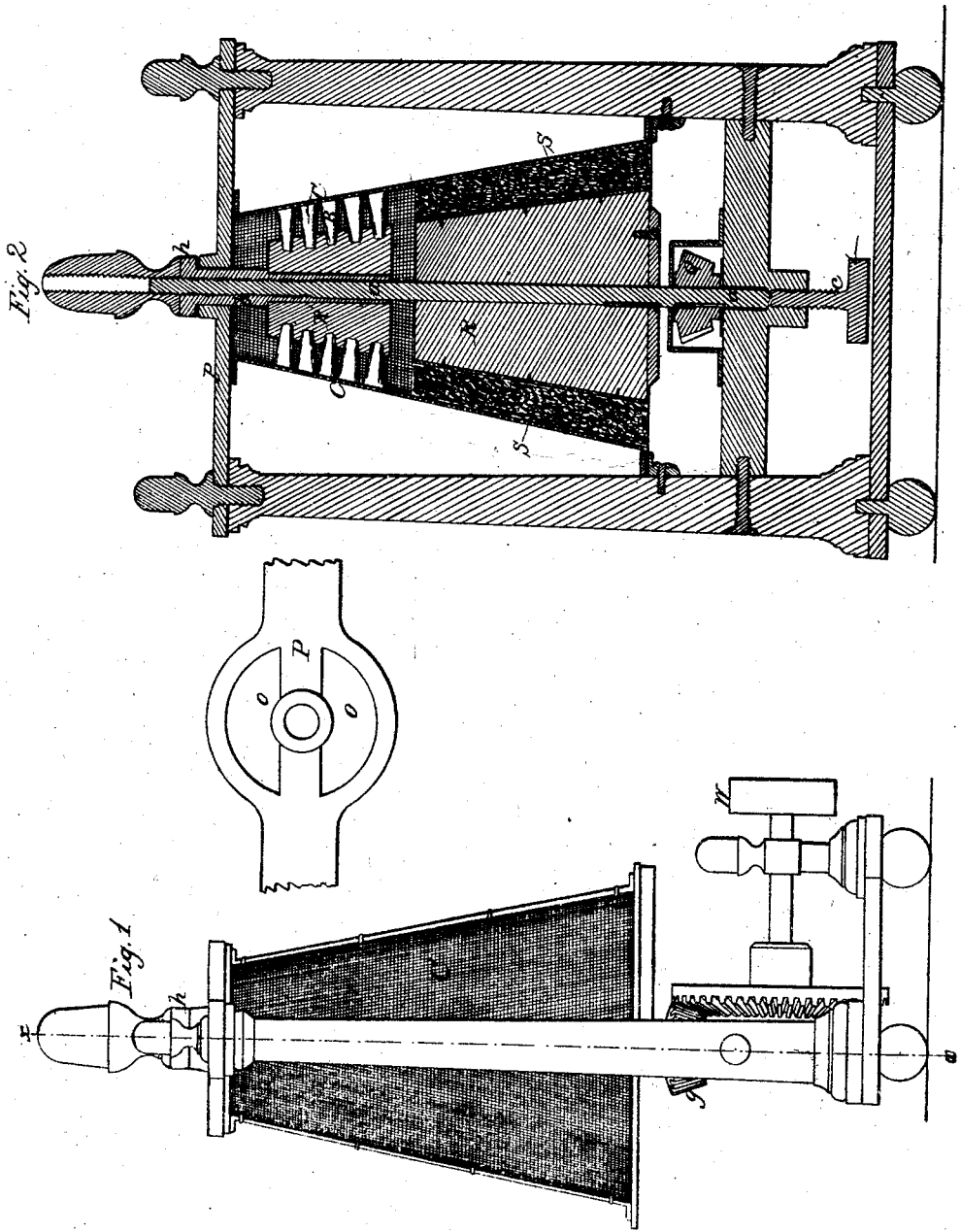

WILSON AGER, OF ROHRSBURG, PENNSYLVANIA.

MACHINE FOR CLEANING RICE.

Specification of Letters Patent No. 18,374, dated October 13, 1857.

*To all whom it may concern:*

Be it known that I, WILSON AGER, of Rohrsburg, in the county of Columbia and State of Pennsylvania, have invented a new and useful Improvement in Rice-Cleaning Machinery, and do hereby declare that the following is a full, clear, and exact description of the construction and operation of the same, reference being had to the annexed drawing, forming part of this specification, in which—

Figure 1 is an elevation of the machine; and Fig. 2 is a section on $x$ $x$ taken through the axis of the rubber shaft.

Similar characters of reference in the several figures denote the same part.

The object of my invention is the removal of the inner pellicle covering the grain, after it has been loosened by any of the known methods.

The nature of the invention consists in constructing the reticulated concave in the form of a right frustum of cone, and of employing within it, a rubber of the same form, with the surface of its upper portion, a brush, and its lower portion having a sheepskin covering; the entire rubber having a vertical adjustment to compensate for wear; the two portions being susceptible of a further relative adjustment, to accommodate the unequal wear of the brush and sheepskin.

In the drawing C is the reticulated casing supported by a suitable frame; the cross piece P, having openings $o$ $o$, for the passage of the rice to the machine.

R R' are the two sections of the rubber, the former covered with a sheepskin S, and secured to a solid shaft $a$; and the latter provided with bristles B, and secured to a hollow shaft $b$.

The upper portion of the shaft $a$ has a screw thread passing through a female thread in the hollow shaft $b$. It rests upon the end of a screw $c$, and is capable of being lifted by the turning of this screw. Motion is given to the entire rubber by power applied to band wheel W.

The operation of this machine is as follows: The rubber R is adjusted to give the desired pressure by turning screw $c$, so as to lift the shaft $a$ through pinion Q. Then by power applied to head $h$ of hollow shaft $b$, the section R' of the rubber is adjusted so that the brush will press properly against the concave C. Power is applied to wheel $w$, and the rice fed in at opening $o$ $o$. The grain first passes between the brush and the casing, where the cavity from which the germ has been removed is thoroughly cleaned; and then passes to the sheepskin covered section, where the polishing is completed. When the sheepskin becomes worn, the turning of screw $c$, at once adjusts the rubber to the proper degree of pressure. But as the brush does not wear as rapidly as the lower section, the lifting of shaft $a$ will make it fit too tight. This is obviated by turning head $h$, and lowering section R' until properly adjusted. This adjustment is repeated until the skin is entirely worn out. By this construction, the rubbers can be made to have the same pressure at all times, and the sheepskin covering be retained upon the rubber until it is too much worn to perform its function.

The combination of sheepskin and brush upon the rubber is advantageous, since the latter cleans properly the germ cavity, which is not accomplished fully by the sheepskin alone.

I am aware that reticulated concaves have been used and make no claim for that portion of my machine. Neither do I claim an independent adjustment of rubbers such as is shown in the patent of Clark Jacobs, 1846: Nor do I claim broadly the construction of rubbers with brush and sheepskin surface. But What I do claim, is the conical, rubbers R R', having the separate adjustment described, in combination with a single reticulated casing, operating substantially as, and for the purposes set forth.

In testimony whereof, I have hereunto signed my name before two subscribing witnesses.

WILSON AGER.

Witnesses:
 GEO. PATTEN,
 JOHN S. HOLLINGSHEAD.